(12) United States Patent
Wang et al.

(10) Patent No.: US 9,183,228 B2
(45) Date of Patent: Nov. 10, 2015

(54) IMAGE RETRIEVAL METHOD, REAL-TIME DRAWING PROMPTING METHOD, AND DEVICES THEREOF

(71) Applicant: Samsung Electronics Co., Ltd., Suwon-si, Gyeonggi-do (KR)

(72) Inventors: Lin Wang, Beijing (CN); Junjun Xiong, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 26 days.

(21) Appl. No.: 14/075,411

(22) Filed: Nov. 8, 2013

(65) Prior Publication Data

US 2014/0169683 A1 Jun. 19, 2014

(30) Foreign Application Priority Data

Dec. 18, 2012 (CN) .......................... 2012 1 0552957

(51) Int. Cl.
*G06K 9/00* (2006.01)
*G06F 17/30* (2006.01)
*G06K 9/46* (2006.01)
*G06K 9/48* (2006.01)

(52) U.S. Cl.
CPC ........ *G06F 17/30259* (2013.01); *G06K 9/4604* (2013.01); *G06K 9/4642* (2013.01); *G06K 9/48* (2013.01)

(58) Field of Classification Search
CPC .......... G06F 17/3025; G06F 17/30259; G06F 17/30256; G06F 17/30265; G06K 9/00536; G06K 9/3233; G06K 9/46; G06K 9/4604; G06K 9/4642; G06K 9/4652; G06K 9/6204; G06K 2009/4666; Y10S 707/99933; Y10S 707/99934; Y10S 707/99935; Y10S 707/99936; Y10S 707/99937; Y10S 707/99945; Y10S 707/99948
See application file for complete search history.

(56) References Cited

U.S. PATENT DOCUMENTS

| 5,983,237 | A  | * | 11/1999 | Jain et al. .............................. 1/1 |
| 6,253,201 | B1 | * | 6/2001  | Abdel-Mottaleb et al. ........... 1/1 |
| 7,492,972 | B2 | * | 2/2009  | Bober .......................... 382/305 |
| 2008/0050049 | A1 | | 2/2008 | Bober |

FOREIGN PATENT DOCUMENTS

| JP | 2000076302 A | 3/2000 |
| JP | 2007328406 A | 12/2007 |

* cited by examiner

*Primary Examiner* — Jose Couso
(74) *Attorney, Agent, or Firm* — Jefferson IP Law, LLP

(57) ABSTRACT

An image retrieval method is provided. The method includes detecting an outline of an image and obtaining an outline feature of the image, generating an index list in an image database according to the outline feature, and obtaining a sketch input by a user and retrieving images containing the sketch from the index list. The various embodiments of the present disclosure also provide an image retrieval device and a real-time drawing prompting method and device. The various embodiments of the present disclosure can rapidly and precisely retrieve image information based on contents, and the user can rapidly retrieve desired images by inputting a sketch. The real-time drawing prompting method and device can provide the limner with real-time guidance based on the retrieval of a sketch map.

38 Claims, 10 Drawing Sheets

IMAGE RETRIEVAL METHOD, REAL-TIME DRAWING PROMPTING METHOD, AND DEVICES THEREOF

CROSS-REFERENCE TO RELATED APPLICATION(S)

This application claims the benefit under 35 U.S.C. §119 (a) of a Chinese patent application filed on Dec. 18, 2012 in the State Intellectual Property Office and assigned Serial No. 201210552957.8, the entire disclosure of which is hereby incorporated by reference.

TECHNICAL FIELD

The present disclosure relates to the technical field of image retrieval. More particularly, the present disclosure relates to an image retrieval method and real-time drawing prompting method and devices thereof.

BACKGROUND

Currently, with the development of mobile internet and popularity of the multimedia technology, multimedia information retrieval becomes more and more favored, and an approach of retrieving related information needed by ourselves from a multimedia database on mobile internet or a local multimedia database has been more and more popular among vast users. This approach covers all current information devices, such as home computers, mobile phones, tablet Personal Computer (PC), etc.

However, since the amount of image data becomes increasingly large, existing retrieval solutions may spend an increasing amount of time for a user in searching images. In addition, in some application scenarios, the user may desire to rapidly retrieve images he needs by inputting a sketch.

Further, when a user draws a picture on the terminal device, he hopes to get a prompt or guidance image so as to obtain a required image better. In such application scenarios, drawing a picture by a user can be seen as an application of image retrieval.

The above problems suggest requirements for further developing relevant applications to address these kinds of problems. Therefore, a retrieval method for rapidly and precisely retrieving images that have similar or same contents according to the sketch information input by the user is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems and or disadvantages and to provide at least the advantages described below. Accordingly, an aspect of the present disclosure is to provide an apparatus and method to rapidly and precisely retrieve images that have similar or same contents.

Another aspect of the present disclosure is to provide an image retrieval method. The image retrieval method includes detecting an outline of an image and obtaining an outline feature of the image, generating an index list in an image database according to the outline feature, and obtaining a sketch input by a user and retrieving at least one image containing the sketch from the index list.

Another aspect of the present disclosure is to provide an image retrieval device. The image retrieval device includes an image outline detection module configured to detect an outline of an image and obtain the outline feature of the image, an outline feature management module comprising an index list generated in the image database according to the outline feature, and a retrieval module configured to obtain a sketch input by a user and retrieve images containing the sketch from the index list.

Another aspect of the present disclosure is to provide a real-time drawing prompting method. The real-time drawing prompting method includes detecting and displaying a sketch input by a user on a drawing area and obtaining the sketch input by the user, retrieving images containing the sketch, and displaying the retrieved images underlying the sketch input by the user as a background image in a superimposed manner with weights.

Another aspect of the present disclosure is to provide real-time drawing prompting device. The real-time drawing prompting device includes a sketch detection module configured to detect and display a sketch input by a user on a drawing area and obtain the sketch input by the user, an image retrieval module configured to retrieve images containing the sketch, and a display module configured to displaying the retrieved images underlying the sketch input by the user as a background image in a superimposed manner with weights.

The image retrieval method and device provided by the present disclosure can rapidly and precisely retrieve image information based on contents. Further, the image retrieval method and device provided by the present disclosure enables the user to rapidly retrieve needed images by inputting a sketch. Further, the real-time drawing prompting method and device provided by the present disclosure can provide the limner with real-time guidance so that he can draw desired images better.

To the accomplishment of the foregoing and related ends, one or more various embodiments include the features hereinafter fully described and particularly pointed out in the claims. The following description and the annexed drawings set forth in detail certain illustrative aspects and are indicative of but a few of the various ways in which the principles of the various embodiments may be employed. Other advantages and novel features will become apparent from the following detailed description when considered in conjunction with the drawings and the disclosed various embodiments are intended to include all such aspects and their equivalents.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
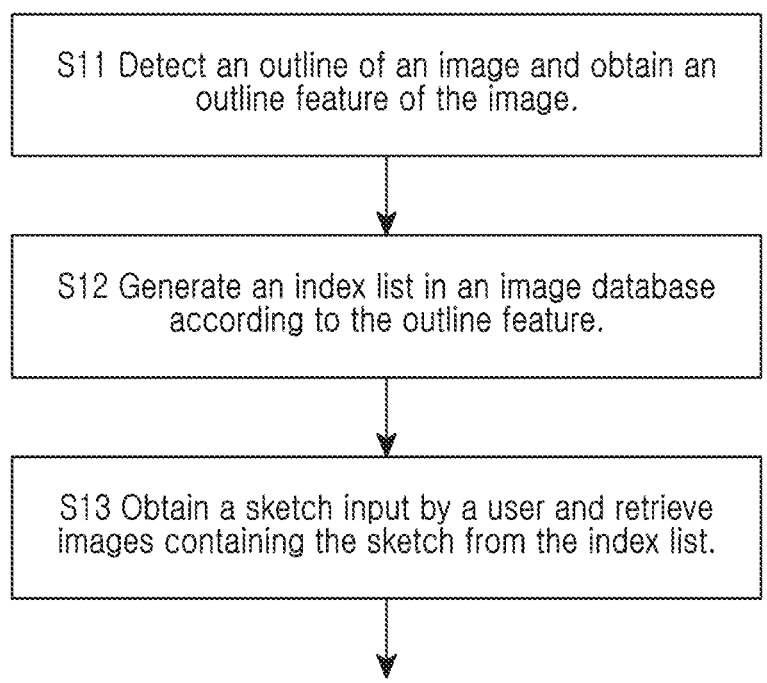
FIG. 1 shows a flowchart of an image retrieval method according to an embodiment of the present disclosure.

FIG. 1 shows a flowchart of an image retrieval method according to an embodiment of the present disclosure. The image retrieval method provided by the present disclosure includes the following operations: S11, detect an outline of an image and obtain an outline feature of the image; S12, generate an index list in an image database according to the outline feature; and S13, obtain a sketch input by a user and retrieve images containing the sketch from the index list. The Content-Based Information Retrieval (CBIR) method provided by the present disclosure can improve retrieval efficiency and achieve a highly precise retrieval performance. Before the retrieval, some information can be added by using human interaction methods so that a terminal device can find desired image information in a highly precise way.

Further, to reduce data volume of edge information of the images and unify data quantities, prior to obtaining the edge information of the images, the image retrieval method provided by the present disclosure can also include normalizing the images. For example, the terminal device can firstly perform a pretreatment of normalization on the obtained edge information of the images to reduce the data volume to be processed in the subsequent operations of edge detection, edge feature extraction, and feature index establishment. For example, the terminal device can normalize sizes of the obtained edge information of the images into a uniform pixel size. For another example, the terminal device can perform a scaling transformation on dimension for original image data by using image shape changing methods and normalize the images in the image database into a uniform pixel size (e.g. 300 pixels×300 pixels). For yet another example, the dimension transformation methods can include but are not limited to performing a scaling transformation on a length and width of the images directly and mapping gray scale values of the pixels directly to corresponding positions. Performing an image scaling by the scaling transformation on dimension can transform non-unified pixel sizes of the original images into a uniform pixel size. The image scaling methods for example may include a nearest neighbor interpolation method, a linear interpolation method, a bilinear interpolation method, etc. Taking 300 pixels×300 pixels as an example herein, firstly the long edge of an image is scaled to 300 pixels, and then the short edge is scaled according to the scaling ratio of the long edge; if the short edge after the scaling is less than 300 pixels, then the terminal device can fill the symmetric top and bottom positions of the image into 300 pixels with black area.

Further, detecting the outline of the image and obtaining the outline feature of the image may include detecting a long edge in the image and obtaining feature information of the long edge. Extracting image edges in the present disclosure can be substituted by extracting image long edges, as a long edge is an edge that is usually easy for a user to sketch. In a real original color image, there are many image details, e.g., an animal's fur. However, when drawing an animal, a user's immediate impulse is to draw a basic outline of the animal, rather than other details. Therefore, when edges of original color images are extracted in the present disclosure, these long edges which represent the outlines of the images, i.e. the main outlines of the images are extracted. When the terminal device is applied to draw a picture by a user, a better result can be achieved by extracting a long edge in a profile of an image that matches to a sketch map drawn by the user. For example, a long edge detection module can be used to extract the edges of the normalized images in the image database. The index list disclosed in the present disclosure refers to a long edge information list generated based on an existing image database.

That is to say, the long edge mentioned in the present disclosure refers to an edge easiest for the user to draw, and when the user performs the drawing operation, it can be understood as an edge easy to sketch by the user. Even if the intensity of each edge in an image is different, some intensity being strong, some intensity being weak, so long as an edge is easy to sketch by the user, it is the long edge of the present disclosure. As is known from the above, on the edges extracted by steerable filtering, because some edge pixels are relatively weak on the original image, they are very weak after the edges are extracted and are even determined as non-edge pixels, resulting in that the extracted edges may be discontinuous.

To address this problem, obtaining the detected long edge in the image may include the following operations: implementing a steerable filtering of the image and obtaining feature information of respective edges in the image, wherein the feature information of an edge includes edge position, edge orientation, and edge intensity, normalizing intensities of the edges and making the intensities of the edges uniform, and connecting the normalized intensities of the edges according to edge orientations to obtain the long edge. Thus, the long edge of the present disclosure is formed by connecting the respective edges according to the normalized intensities of the edges to realize an effect of connecting the discontinuous edges, and meanwhile enhancing the edge intensity of the pixels on the long edge. The feature information of the long edge may include new edge intensities after connecting the edges, edge position, and edge orientation obtained by steerable filtering. Further, connecting the discontinuous edges can adopt edge connecting algorithms to connect pixels belonging to a long edge, i.e. enhancing gradient intensities belonging to a same pixel.

Figure 2A:
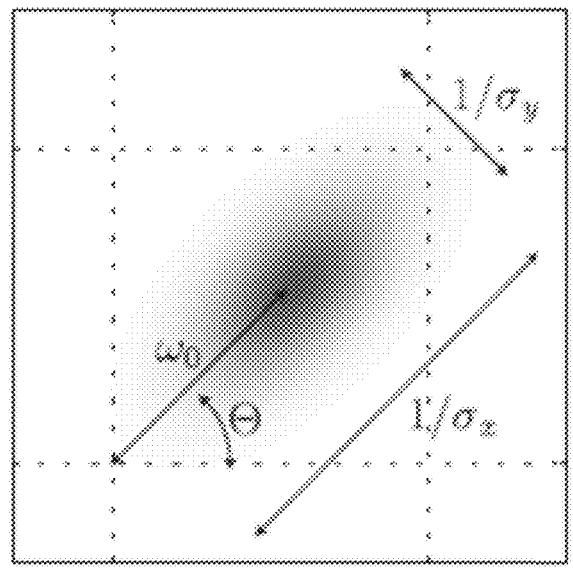
FIG. 2A shows a schematic diagram of a Gabor filter on an orientation of 45° according to an embodiment of the present disclosure.
Figure 2B:
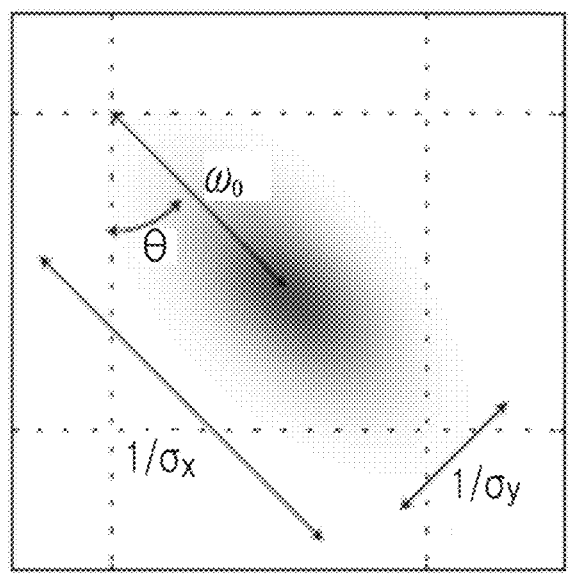
FIG. 2B shows a schematic diagram of a Gabor filter on an orientation of 135° according to an embodiment of the present disclosure.

For example, consider a Gabor filter of 8 orientations as an example in the present disclosure to illustrate the process of filtering an edge image to extract the edge orientation features of the image. The filter used in the present disclosure may include 8 orientations of 0°, 22.5°, 45°, 67.5°, 90°, 112.5°, 135°, and 157.5°. The filter on each orientation is a model of 7 pixels×7 pixels, and the Gabor filters on the orientations of 45° and 135° are shown in FIGS. 2A and 2B, respectively. Each model is generated by controlling the variance of a two-dimension Gauss function on the two orientations. A convolution between each model and the image is performed, and the orientation of a model with the largest convolution response is the pixel orientation of a point in the image. Considering the efficiency of the feature extraction, the above method of obtaining edge information of an image only extracts edge orientations of corresponding edge pixels as the edge feature, and thus the image database generated by these edge features is relatively small, so that the retrieval efficiency and storage efficiency are improved.

To realize high efficiency of image retrieval in the image database according to the sketch drawn by the user, an index list can be generated for the features extracted from the images in the image database to realize the function of quick retrieval. As an embodiment, to quickly retrieve matched images in the image database when retrieving a sketch map, generating edge feature data may include the following operations: generating inverted indexes (i.e., a detailed embodiment of the index list) according to position information $(x, y)$ of the pixels on the long edge in the image and quantified orientation information $(\theta)$ of the pixels on the edge. Therefore, generating an index list in the image database according to the outline feature includes generating an index list in an inverted order for the feature information of the long edges.

Figure 3:
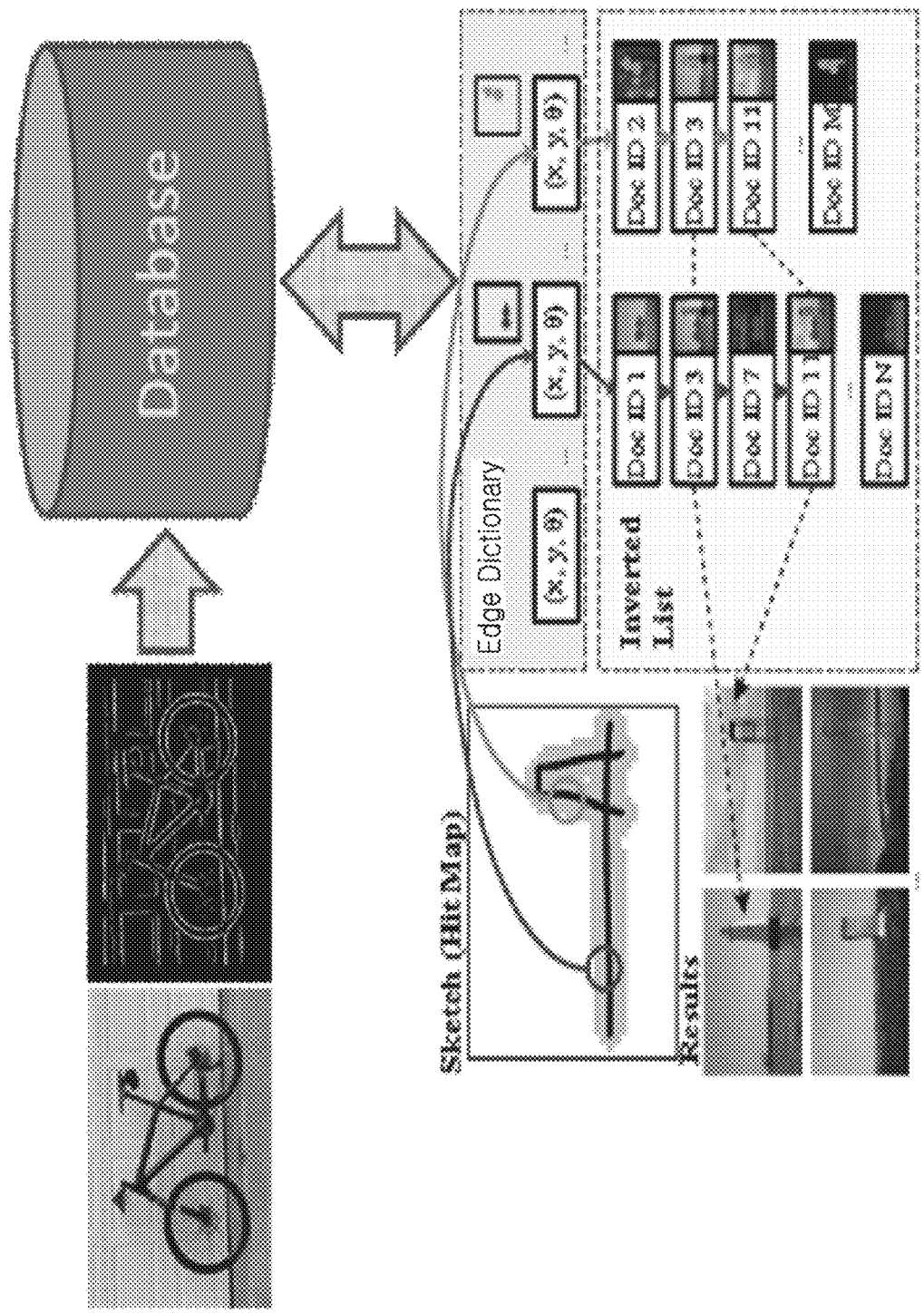
FIG. 3 shows a schematic diagram of generating an index list by using an edge position and edge orientation of a long edge as feature information according to an inverted indexing method adopted by an embodiment of the present disclosure.

FIG. 3 shows a schematic diagram of generating an index list by using the edge position and edge orientation of the long edge as feature information according to an inverted indexing method adopted by an embodiment of the present disclosure. For example, adopting the method of inverted indexing may include but is not limited to generating an image feature index list according to the edge features $(x, y, \theta)$ of the image. For another example, adopting the method of inverted indexing can also include taking the above feature information as a three-dimensional vector and performing inverted indexing separately for the three features respectively so as to reduce the capacity usage of an image library. For yet another example, according the edge orientation angle $\theta$, the orientation feature can be quantified into 6 levels, such as: -15-15, 15-45, 45-75, 75-105, 105-135, and 135-165; then, the orientation feature can be integrated with the edge position $(x, y)$ to form code words $(x, y, \theta)$ one by one in the image database; and then the code words can be adopted by an inverted indexing manner to generate an inverted index list.

As shown in FIG. 3, generating the inverted index list may include the following operations:

Operation 1: generating an index entry, i.e., an Edge Dictionary (as an accompanying drawing sign, it refers to a search interface that realizes a quick retrieval), according to the quantified results of the values of code words $(x, y, \mu)$ (i.e., the obtained feature information of the long edge), wherein variation ranges of x and y for example might be a width and length of an image, respectively, and a variation range of $\theta$, for example, might be the quantified value of an edge orientation. For example, when the index list includes 8 orientations, the orientation value of a long edge could be any integer among the numbers 1-8. The quantified result includes three kinds of information, i.e., x, y, and $\theta$. The edge image can be filtered by the Gabor filter with 8 orientations to realize the quantification.

Operation 2: after extracting edge orientations for a certain image, make statistics of the gradient orientation $\theta i$ for each pixel (the coordinate being $(xi, yi)$) on each image sequentially, and store an index number of the image to the generated index entry $(xi, yi, \theta i)$. Since the positions of edge points on each image are different, it is necessary to make statistics of information of every pixel; however, an image ultimately stored in the inverted index list must be an image that has an edge on this pixel and the edge orientation conforms to the retrieval entry. The normalization of the edge orientation is used to extract the long edge in the original image, and the edge orientation is continuous between W and 180°. The gradient orientation herein is a quantified orientation obtained by filtering the extracted long edge image by using a Gabor filter of 8 orientations, the value thereof being an integer among 1-8. The gradient orientation of each pixel is an orientation of a local long edge where the pixel is located. For example, the index numbers of images in the image database are assumed as 1, 2, . . . , N, where N is the total number of images in the image database. As shown in FIG. 3, the data of the first column in the inverted list are: DOC ID1, DOC ID3, . . . , DOC IDN, representing index numbers of images in the corresponding entry $(xi, yi, \theta i)$ stored in the Edge Dictionary (the correspondence relations are labeled by arrows), that is, in the images with index numbers being 1, 3, . . . , N, the gradient orientations of pixels located at $(xi, yi)$ are all $\theta i$. The gradient orientations can be obtained in the operation of steerable filtering, and an edge orientation is the gradient orientation of each pixel in the edge. For example, a gradient orientation is a quantified orientation obtained by filtering an extracted long edge image by using the Gabor filter of 8 orientations, and the value which is an integer among 1-8. Subsequently, the index number of the image is stored in the generated index entry $(xi, yi, \theta i)$.

Operation 3: after making statistics of each pixel in each image, a final data table is an inverted index list, that is, taking the quantification of (x, y, θ) as an entry and taking image index numbers conforming to the entry as storage information.

It can be known from above that the image features according to the present disclosure may include position information of an object in an image configured to realize the consistency of positions of the object on the sketch and on a searched image. The image features of the present disclosure can also include pixel gradient information, configured to guarantee the consistency of shapes and outlines of the object of the sketch and a searched image. Meanwhile, considering fluctuation existing in the two features of the sketch and the searched image, the above scheme of the present disclosure can add tolerance radius during the quantification of gradient orientations and calculation of similarities so as to retrieve images of which the shapes have small differences, that is, substantially similar shapes. The image retrieval efficiency can be extraordinarily improved and the retrieval precision can also be improved by generating the index list with the inverted indexing structure. Thus, generating an index list for the feature information of a long edge in an inverted order may include the following operations: generating an index entry (x, y, θ) according to the obtained feature information of the long edge, making statistics of gradient orientation of each pixel in each image sequentially and storing an index number of each image in a corresponding index entry (x, y, θ), and generating the index list through the index entry (x, y, θ) in an inverted order.

Further, obtaining the sketch input by the user and retrieving the images containing the sketch from the index list according to the sketch may include detecting the outline feature of the sketch input by the user, determining whether the index list contains a long edge similar to the outline of the sketch according to accumulated hits, and obtaining images containing the long edge based on the accumulated hits.

Further, determining whether the index list contains a long edge similar to the outline of the sketch according to accumulated hits may include the following operations: detecting the feature information of each pixel in the outline of the sketch, wherein the feature information of the pixel includes a position feature and an orientation feature, and determining whether the index list contains pixels in the long edge that are similar to the pixel in the outline of the sketch.

Retrieving images by accumulated hit rates may include the following operations:

Operation 1: detect the outline of the input sketch, denoting it as symbol p, and obtain the coordinate (x, y) of each pixel in the outline of the sketch and the edge orientation θ of the pixel. All information of the outline of sketch is denoted by feature set D=[$p_1, p_2, \ldots, p_n$], where n is the total number of pixels of the outline in the sketch, and where the feature of ith point is denoted as $p_i=(x_{pi}, y_{pi}, \theta_{pi})$, assuming that the coordinate of the point constitutes the vector $L_{pi}(x_{pi}, y_{pi})$.

Operation 2: using Q as the image database, wherein the qth image is denoted as q (the range of q is 1, 2, ..., N), the jth outline point of the image is denoted as $q_j=(x_{pj}, y_{pj}, \theta_{pj})$, and assumes that the coordinate of the point constitutes the vector $L_{qj}=(x_{qj}, y_{qj})$. For the point $p_i$ in the sketch map, algorithm provided by the present disclosure will search the image q, which has a point with similarity condition as point $p_i$ in the image database, wherein the image where the point has similarity condition located is defined as Equation (1):

$$q \in Q(\|L_{qj} - L_i\| \le r \,\&\, \theta_{pi} = \theta_{qj}) \quad \text{Equation (1)}$$

Operation 3: defining $\text{Hit}_Q(p_i)$ as a histogram with the number of dimensions being N, each dimension representing an image in the image database, and when the image q that meets similarity with $p_i$ is found in Q via Equation (1), then a vote is given to this image, which is represented as $\text{Hit}_Q(p_i)$ plus 1 on qth dimension in mathematics, the detailed Equation (2) being presented as follows:

$$\begin{cases} \text{Hit}_Q(p_i) = 1, & \exists q \in Q(\|L_{qj} - L_{pi}\| \le r \,\&\, \theta_{pi} = \theta_{qj}) \\ 0, & \text{others} \end{cases} \quad \text{Equation (2)}$$

In Equation (2), r denotes deviation radius.

Operation 4: make statistics of matching situations of similarity between all the edge points on the sketch and the images in the image database sequentially, and sum the voting result of each image and normalize it so as to get the histogram of similarity between each image and the drawn sketch map, and Equation (3) representing the similarity between each image and the sketch map, which is as follows:

$$\text{Sim}_{D \to Q} = \frac{1}{|D|} \sum_{p_i \in D} \text{Hit}_Q(p_i) \quad \text{Equation (3)}$$

In Equation (3), D is a set of all edge pixels for calculating the similarity of the image, |D| represents the number of edge pixels of the image. The Equation (3) is dividing the number of pixels of the image q in the data database that match the user sketch by the number of edge pixels in the image q. This is used to represent the influence of the number of image pixels on the image similarity. For example, if there are two images in the data database that have a same number of pixels (e.g. 100) matching the user's sketch, however, the number of pixels in a certain image A is 200 and the number of pixels in another image B is 500, then the similarity of image A and the sketch map is 100/200=0.5, while the similarity of image B and the sketch map is 100/500=0.2; thus, it can be determined that image A is more similar to the sketch map.

Operation 5: based on the similarity of each image in the image database, display the images in the image database to the user in a descending order. For example, search and display a candidate image set from the results of accumulated calculation according to a preset number of candidate images.

Operation 6: select an image from the candidate image set.

Therefore, by using above method, the similarities calculated can be sorted according to the image sequence so that a candidate image set with prior ranking N is obtained, and the number of images in the set is far less than the number of images in the original image database, so that accurate ranking calculation and accurate generation of a background image (shadow) can be performed based on the set. A background image can be a shadow. From this it can be known that the present disclosure obtains the candidate image set by rough retrieval, wherein the candidate image set can be understood as a part of the image database, then provide images with accurate rankings in the candidate image set to the user, then the user needs only to make a selection to obtain the needed image so as to finish the drawing. Further, the images in the candidate image set can be added with weights to automatically generate background images so as to guide the user to draw a picture.

Figure 4:
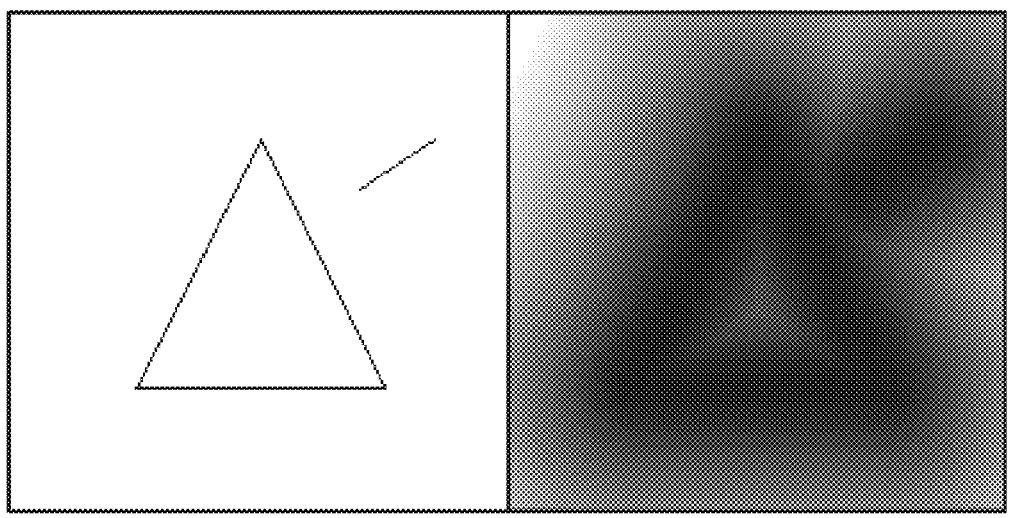
FIG. 4 shows a schematic diagram of a calculation result of binary image distance transform according to an embodiment of the present disclosure.

FIG. 4 shows a schematic diagram of the calculation result of binary image distance transform according to an embodiment of the present disclosure. Calculating the similarity includes extracting edges for an original image and quantifying them into binary images by setting a threshold, calculating the distance transform value of each pixel in the binary image, and generating a distance transform distribution map. The distance transform for an image may include the following operations: giving a relatively large weight to a pixel close to an extraction edge, and giving a relatively small weight to a pixel far from the extraction edge. According to the Equation (4), make statistics of average value of the sum of the distance transform values of points on the distance transform distribution map corresponding to the input sketch, and the Equation (4) is as follows:

$$Dist_{D \to Q} = \frac{1}{|D|} \sum_{p_i \in D} Value_Q(p_i) \qquad \text{Equation (4)}$$

In Equation (4), $Value_Q(p_i)$ represents distance transform values of positions of images in the data database Q corresponding to the edge point $p_i$ in the sketch map p, Equation (4) represents the calculation of average distance transform value of the images in the sketch and in the data database, this distance transform value is used as a base for matching similarity accurately, that is the larger the $Dist_{D \to Q}$ is, the smaller the similarity is; while the smaller the $Dist_{D \to Q}$ is, the larger the similarity is.

Figure 5:
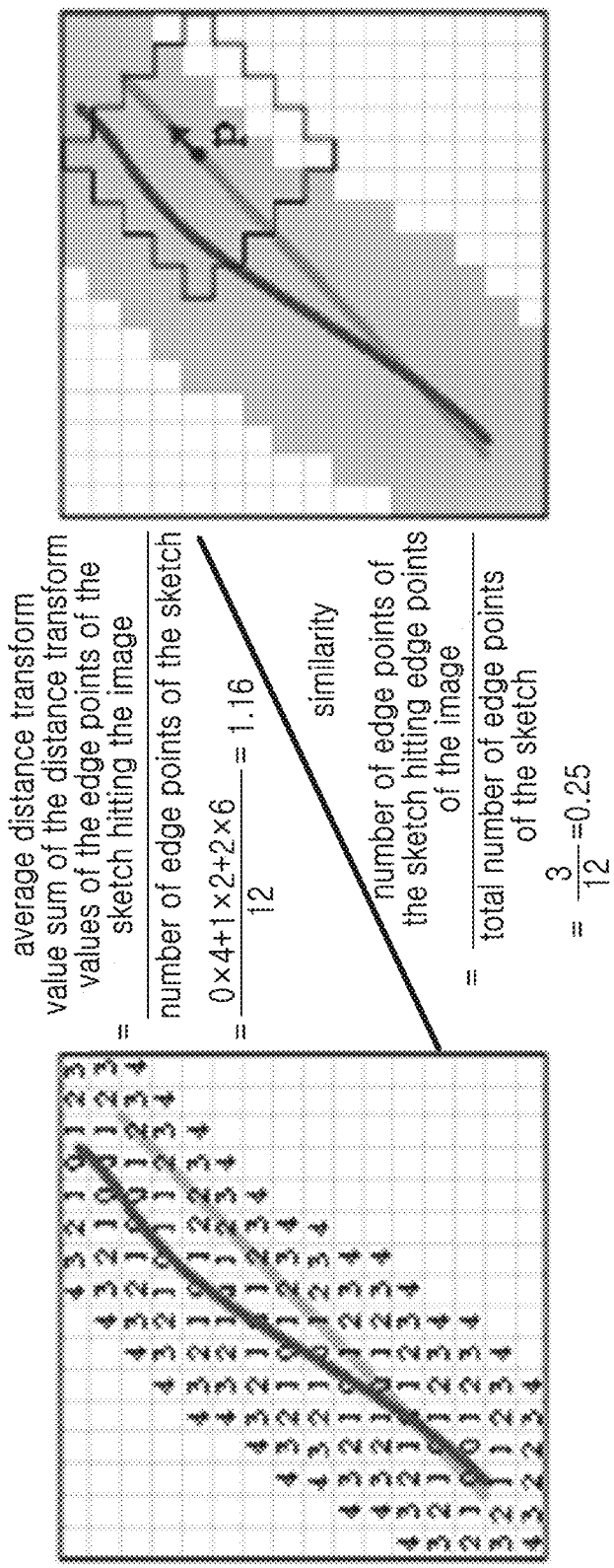
FIG. 5 shows a schematic diagram of a precise similarity calculation process according to an embodiment of the present disclosure.

FIG. 5 shows a schematic diagram of a precise similarity calculation process according to an embodiment of the present disclosure, the light color being an image edge on the user's sketch and the dark color being an image edge in the data database. For example, the sketch drawn by the user is filtered by the Gabor filter to extract edge features thereof, the image containing the sketch in the image database is retrieved by accumulating total number of hits thereof, and a candidate image set consisting of the prior N candidate images is obtained based on the sorting result of the total number of hits. The edge image of each image in the candidate image set is a binary image. By calculating the distance transform values of these binary edge images, and then making statistics of average value of the sum of the distance transform values of the points on the distance transform distribution map corresponding to the sketch drawn by the user according to the Equation (4). The smaller the distance transform value obtained according to the Equation (4) is, the more accurate the similarity between the corresponding image and the sketch drawn by the user is. The N images in the candidate image set can be sorted according to the distance transform value sequence. Since above operation is only performed in a candidate set with a small amount of images, an accurate ranking result can be obtained efficiently.

Figure 6:
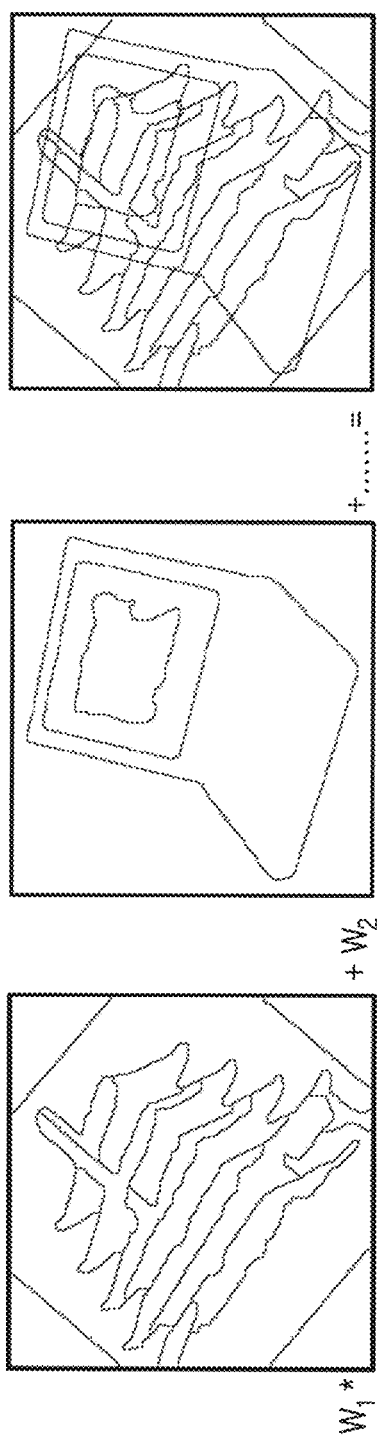
FIG. 6 shows a schematic drawing of automatically generating a background image according to an embodiment of the present disclosure.

FIG. 6 shows a schematic drawing of automatically generating a background image according to an embodiment of the present disclosure. Superimposing of images may include presenting a part of an image other than the sketch outline as a background image. For example, the superimposing of images may include taking an image, the similarity of which meets a preset condition, as a background image to overlay on an image layer underlying the outline of the input sketch, where a background image generating process is calculated according to Equations (5) and (6), as follows:

$$S = \sum_i W_i E'_i \qquad \text{Equation (5)}$$

Where S is an ultimately obtained shadow image, $W_i$ is a shadow weight, and $E'_i$ are edge pixels of the ith image in the image database.

$$W_i = \exp(-Dist_{D_i \to Q}) \qquad \text{Equation (6)}$$

In Formula (6), $W_i$ represents the shadow weight generated for each image got by average distance transform value calculated by Equation (4), and $E'_i$ represents image edge pixels of the ith image in the image database. By way of the equation, the retrieved results are combined into superimposed images. If an image has a small average distance transform value with the user's sketch, the image obtains a large weight and is displayed in a relatively deep color in the integrated image; and if an image has a large average distance transform value with the user's sketch, the image obtains a small weight and is displayed in a relatively light color in the integrated image. Therefore, the method and device provided by the present disclosure can rapidly and accurately search image information based on the contents.

Further, obtaining images containing the long edges based on the accumulated hits may include performing a preliminary retrieval from the index list and generating a candidate image set for the images containing the long edge, and when a new sketch is detected, performing the retrieval again and updating the candidate image set. In this way, retrieving an image from the candidate image set again and again according to the re-generated outline feature data of the sketch can further reduce the amount of the candidate images in the candidate image set, so as to obtain an image with a high similarity and achieve the technical effect of accurately retrieving the images.

Further, generating a candidate image set for the images containing the long edge may include sorting the images in the candidate image set according to rankings of similarity thereof after determining that the index list contains a long edge similar to the outline of the sketch.

Further, obtaining the sketch input by the user and retrieving the images containing the sketch from the index list may further include displaying the images in the candidate image set underlying the sketch input by the user in a superimposed manner according to the rankings of the similarity thereof.

Further, the superimposed manner may include presenting part of the long edges of the image which is not overlapped with the outline of the sketch as a background image.

Figure 7:
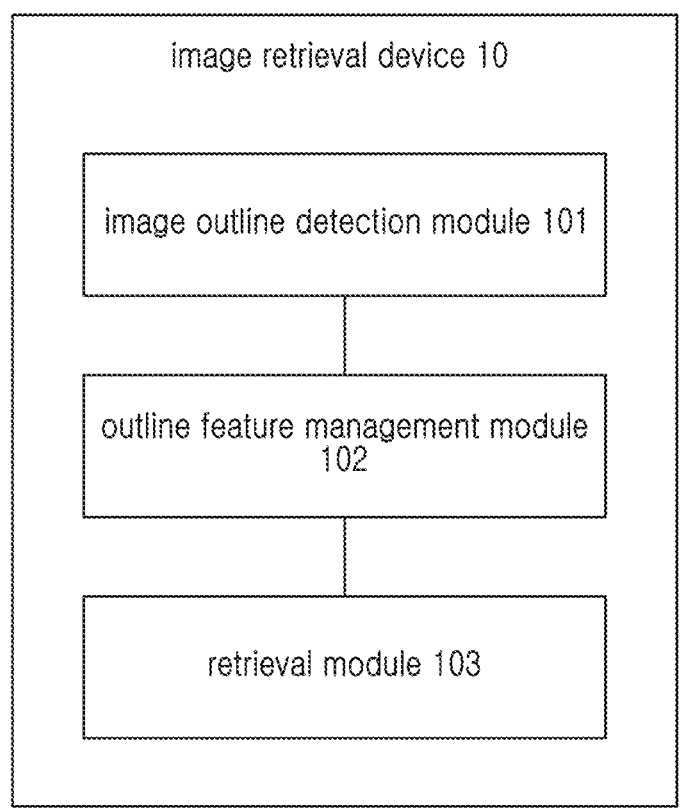
FIG. 7 shows a flowchart of an image retrieval device according to an embodiment of the present disclosure.

As shown in FIG. 7, the present disclosure also provides an image retrieval device 10, which includes an image outline detection module 101 configured to detect an outline of an image and obtain the outline feature of the image, an outline feature management module 102 comprising an index list generated in the image database according to the outline feature, and a retrieval module 103 configured to obtain a sketch input by a user and retrieve images containing the sketch from the index list.

Further, the image outline detection module 101 is configured to detect a long edge of the image and obtain feature information of the long edge.

Further, the image outline detection module 101 includes a steerable filtering unit configured to implement a steerable filtering to the image and obtain feature information of respective edge in the image, wherein the feature information of the edge includes edge position, edge orientation, and edge intensity, a normalization unit configured to normalize intensities of the edge and make the intensities of the edge be uniform, and a long edge obtaining unit configured to connect the normalized intensities of the edges according to the edge orientation to obtain the long edge.

Further, the outline feature management module 102 generates the index list for the feature information of the long edge in an inverted order.

Further, the index list includes an index entry (x, y, θ) generated according to the obtained feature information of the long edge, a gradient orientation of each pixel in each image and the index number of each image stored in the corresponding index entry (x, y, θ), and an inverted sorting unit configured to generate the index list through the index entry (x, y, θ) in an inverted order.

Further, the retrieval module 103 may include an outline feature extraction unit configured to detect the outline feature of the sketch input by the user, a determination unit configured to determine whether the index list contains a long edge similar to the outline of the sketch, and an image retrieval unit configured to retrieve images containing the long edge.

Further, the outline feature obtaining unit may be configured to detect the feature information of each pixel in the outline of the sketch, wherein the feature information of the pixel includes position features and orientation features, and determine whether the index list contains a pixel in the long edge that are similar to the pixel in the outline of the sketch.

Further, the image retrieval unit is configured to perform a preliminary retrieval from the index list and generate a candidate image set for the images containing the long edge, and perform the retrieval again when a new input sketch is detected and update the candidate image set.

Further, the image retrieval unit may be configured to sort the images in the candidate image set according to rankings of the similarity thereof after determining the index list contains a long edge similar to the outline of the sketch.

Further, the image retrieval device 10 may further include a display module configured to display the images in the candidate image set underlying the sketch input by the user in a superimposed manner according to the rankings of the similarity thereof.

Further, the superimposed manner may include presenting part of the long edges of the image which is not overlapped with the outline of the sketch as a background image.

From above it can be known that the image retrieval method and device provided by the present disclosure can retrieve image information rapidly and accurately based on contents. Further, the image retrieval method and device can enable the user to rapidly retrieve other desired images by entering a sketch.

Figure 9:
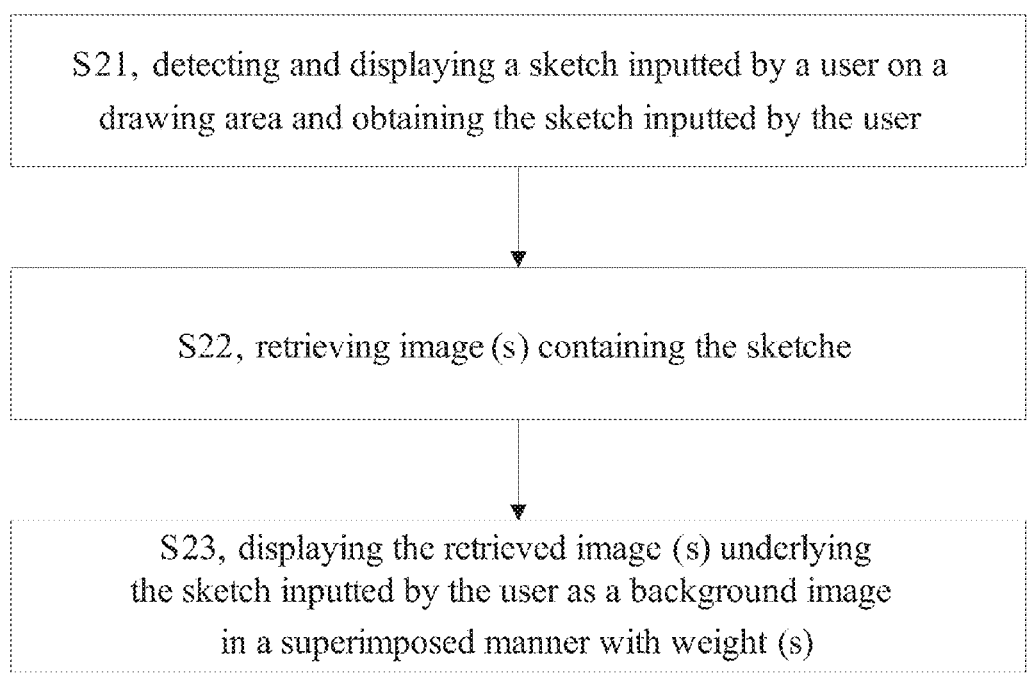
FIG. 9 shows a schematic diagram of another way of displaying the real-time drawing prompting method according to an embodiment of the present disclosure.

FIG. 9 shows a flowchart of a real-time drawing prompting method according to an embodiment of the present disclosure. The real-time drawing prompting method proposed by the present disclosure includes the following operations: S21, detect and display a sketch input by a user on a drawing area and obtain the sketch input by the user; S22, retrieve images containing the sketch; and S23, display the retrieved images underlying the sketch input by the user as a background image in a superimposed manner with weights. For example, a long edge may be collected from the outline of the sketch input by the user, then an image having same long edge is retrieved from the image database, and finally, the matched image is output and displayed. For example, the output images are superimposed with weights according to the rankings of similarity thereof, and then a background image is automatically generated to guide the user for drawing a picture.

Figure 8:
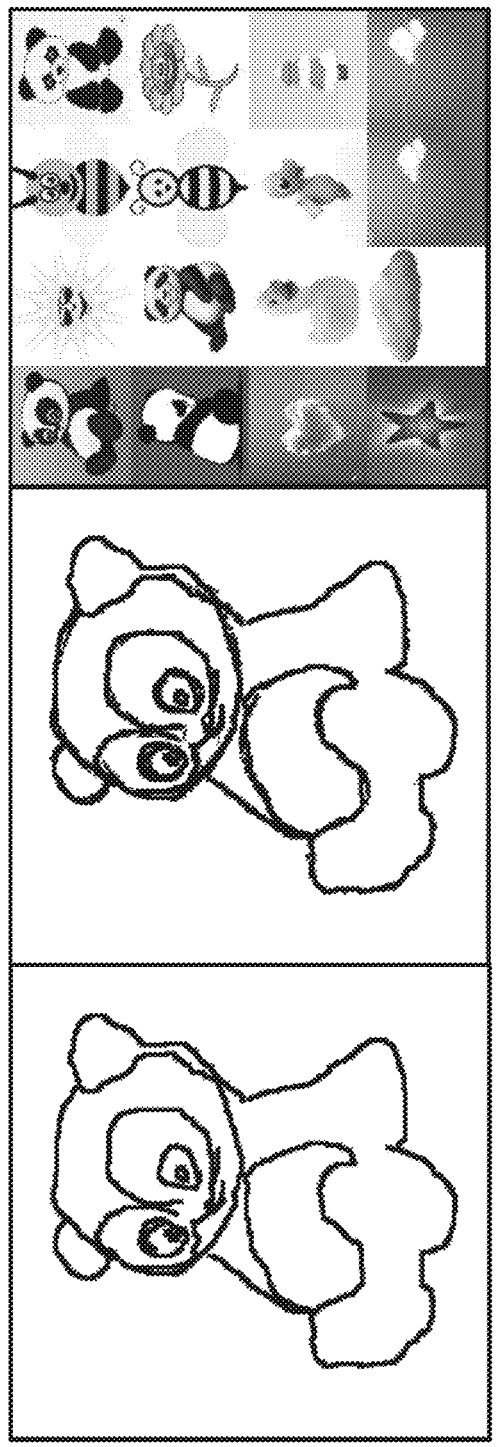
FIG. 8A shows a schematic diagram of the real-time drawing prompting method according to an embodiment of the present disclosure.
FIG. 8B shows a schematic diagram of a way of displaying a sketch input by the user in the real-time drawing prompting method according to an embodiment of the present disclosure.
FIG. 8C shows a schematic diagram of another way of displaying the real-time drawing prompting method according to an embodiment of the present disclosure.

FIG. 8A shows a schematic diagram of the real-time drawing prompting method according to an embodiment of the present disclosure. FIG. 8B shows a schematic diagram of a way of displaying a sketch input by the user in the real-time drawing prompting method according to an embodiment of the present disclosure. For example, according to the relevant sketch as shown in FIG. 8A drawn by the user, images similar to the sketch as shown in FIG. 8B are retrieved from the image database, and the edges of the images are superposed with weights according to the rankings of similarity thereof, and then a background image is automatically generated to guide the user for drawing a picture. The real-time drawing prompting method provided by the present disclosure can perform the subjects such as user drawing, sketch retrieval, and a background image generation in real time, and therefore improves the user's experience.

Further, the real-time drawing promoting method may include when the sketch input by the user changes, retrieving images containing the sketch again and displaying the updated background images in real time.

Further, the changes of the sketch input by the user include any of the following cases: a new sketch sequentially input by the user is detected, a sketch that the user traces the background image is detected, and a new sketch input by the user is detected after erasing an existing sketch. For example, when a displayed background image is not required, the user can continue to input a new sketch, and the terminal device can continuously detect images containing all of the sketches in the image database and prompt them to the user. For example, when the displayed background image is required, the user can trace the background image. For another example, when a part of content in the displayed background image is not required, the user can erase the part that he does not need by using an erase application and input a new sketch, and then the terminal device can combine un-erased sketch and the newly input sketch to retrieve images containing all of the sketches in the image database, and prompt them to the user in real time.

Further, displaying the retrieved images underlying the sketch input by the user as a background image in a superimposed manner with weights may include differentially displaying the retrieved images containing the sketch according to rankings of similarity thereof. For example, the higher the similarity between a background image and the sketch is, the terminal device will display the background image with a deeper color, and the lower the similarity between a background image and the sketch is, the terminal device will display the background image with a lighter color. According to another embodiment, for example, the higher the similarity between a background image and the sketch is, the terminal device will display the background image with a brighter luminance, and the lower the similarity between a background image and the sketch is, the terminal device will display a background image with a darker luminance. In this way, when a drawing function is applied, a user can easily get a desired background image, so that he can draw a picture by following the prompt of the background image, and thus he can have better drawing experience.

Further, the real-time drawing prompting method of the present disclosure may include when the images containing the sketch are retrieved, generating a candidate image box and displaying the images in the candidate image box when the similarity reaches a predetermined value for the user to select. FIG. 8C shows a schematic diagram of another kind of display of the real-time drawing prompting method according to an embodiment of the present disclosure. The candidate image box can be designed as shown in FIG. 8C so that the terminal device can display candidate images of which the similarity reaches a predetermined value to facilitate the user to select, etc. For example, according to the relevant sketch as shown in FIG. 8A drawn by the user, images similar to the sketch as shown in FIG. 8B are retrieved from the image database and sorted according to their similarity as shown in FIG. 8C, and the edges of the images are superposed with weights according to the rankings of similarity thereof, and then a background image is automatically generated to guide the user for drawing a picture. It can be understood that the drawing prompting method of the present disclosure can also be accomplished using only a background image as shown in FIG. 8B, and the drawing prompting operation shown in FIG. 8C is not necessary.

Further, displaying images in the candidate image box when the similarity reaches a predetermined value may include sorting the images containing the sketch input by the user according to the rankings of the similarity thereof.

Further, displaying images in the candidate image box which the similarity reaches a predetermined value similarity for the user to select may include when an image displayed in the candidate image box selected by the user is detected, displaying an image in the drawing area, which is corresponding to the selected image in the candidate image box and superimposed with a weight as a background image, with highlight or in deep color. For example, when the user selects the panda image shown on the top left of the FIG. 8C, the terminal device will display the panda image which is located in the background image with highlight, so that the user can be prompted to trace the panda image. For another example, when the user selects the panda image on the top left of the FIG. 8C, the terminal device will display the panda image which is located in the background image in a deeper color, such as a color that is applied to have an obvious contrast to the sketch input by the user, so that the user can be prompted to trace the panda image.

Further, retrieving images containing the sketch may include retrieving images containing the sketch input by the user according to any of retrieval methods provided by FIG. 1 to FIG. 6.

Figure 10:
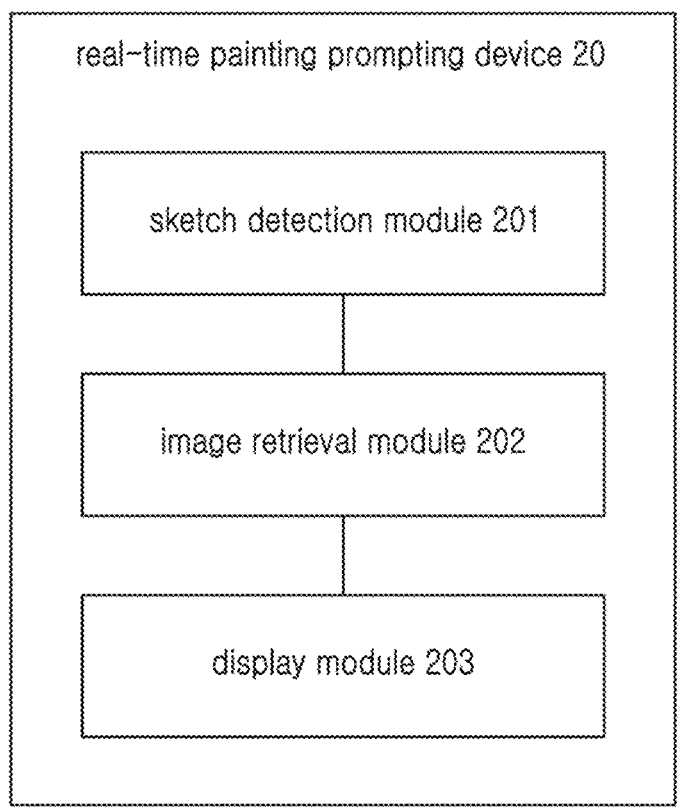
FIG. 10 shows a schematic diagram of a real-time drawing prompting device based on sketch retrieval according to an embodiment of the present disclosure.

Referring to FIG. 10, the present disclosure also provides a real-time drawing prompting device 20, which can include a sketch detection module 201 configured to detect and display a sketch input by a user on a drawing area and obtain the sketch input by the user, an image retrieval module 202 configured to retrieve images containing the sketch, and a display module 203 configured to display the retrieved images underlying the sketch input by the user as a background image in a superimposed manner with weights.

Further, the image retrieval module 202 may be further configured to retrieve images containing the sketch again and sending the retrieved images to the display module 203 when the sketch input by the user changes, so that the display module 203 displays the updated background image in real time.

Further, the sketch detection module 201 may be configured to detect a new sketch sequentially input by the user, detect a sketch that the user traces the background image, and detect a new sketch input by the user after erasing an existing sketch.

Further, the display module 203 may be configured to differentially display the retrieved images containing the sketch according to rankings of similarity thereof.

Further, the display module 203 may be configured to when the sketch detection module 201 detects that an image has a high similarity with the sketch, then display the image in a deep color, or when the sketch detection module 201 detects that an image has a high similarity with the sketch, then display the image in a bright luminance.

Further, the real-time drawing prompting device 20 may include a candidate image box configured to display the images therein of which the similarity reaches a predetermined value for the user to select when the image retrieval module 202 retrieves images containing the sketch.

Further, the image candidate box may be configured to sort the images containing the sketch input by the user according to the rankings of the similarity thereof.

Further, the display module 203 may be configured to display an image in the drawing area, which corresponds to the selected image in the candidate image box and superimposed with a weight as a background image, with highlight or in deep color, when an image displayed in the candidate image box selected by the user is detected.

Further, the image retrieval module 202 may be configured to retrieve images containing the sketch input by the user according to any one of the retrieval methods of FIG. 1 to FIG. 6, or include respective constitution modules in any retrieval device provided above and in FIG. 7.

As is known from the above, the real-time drawing prompting method and device provided by the present disclosure is capable of providing real-time instruction to the limner, so as to better draw desired images.

It can be understood by those skilled in art that a part or all of the operations contained in the above various embodiments and methods can be realized by a program instructing relative hardware, the program stored in a non-volatile computer-readable storage medium, and when the program stored therein is being executed any of or combination of the operations of the method various embodiments is involved. It is understood that a general purpose computer can be programmed to execute the above disclosure and thereby become a special purpose machine for executing the described functionality. Similarly, any function that can be programmed in software can also be implemented by special-purpose hardware. In addition, the respective functional units in the respective various embodiments of the present disclosure can be integrated into a processing module, or physically exist in respective units, or be integrated into a module by any number of units. The above integrated module can be realized in hardware or can be realized by way of soft functional modules. When the integrated module is realized by way of soft functional modules and is sold or used as independent products, it can also be stored in a non-volatile computer-readable storage medium. The storage medium mentioned above includes any non-volatile computer readable storage medium and can be, for example, Read Only Memory (ROM), Random Access Memory (RAM), magnetic disk, or other disk media such as Compact Disk ROM (CD-ROM) and Digital Versatile Disk (DVD).

It can be understood by those skilled in the art that the present disclosure have been described with reference to the structural diagrams and/or blocks and/or flowcharts of methods, systems, and computer programming products of the embodiment of the present disclosure. It should be understood that each block in the structural diagrams and/or blocks and/or flowcharts or block combinations in these structural diagrams and/or blocks and/or flowcharts or blocks can be implemented by using computer programming instructions. These computer programming instructions can be provided to a general object computer, a specialized computer or other processors of programmable data processing methods to generate the machine, so that the instructions executed by a computer or processors of other programmable data processing methods to generate the methods indicated by the boxes in the structural diagrams and/or block diagrams and/or flowcharts.

It can be understood by those skilled in the art that the operations, measures, schemes in the various operations, methods and flowcharts that have been discussed can be alternated, reordered, changed, combined, or deleted without departing from the spirit or scope of the disclosure.

While the present disclosure has been shown and described with reference to various embodiments thereof, it will be understood by those ordinary skilled in the art that various changes in form and details may be made therein without departing from the spirit and scope of the present disclosure as defined by the appended claims and their equivalents.

What is claimed is:

1. An image retrieval method, the method comprising:
   detecting an outline of an image and obtaining an outline feature of the image;
   generating an index list in an image database according to the outline feature;
   obtaining a sketch input by a user; and
   retrieving images containing the sketch from the index list,
   wherein the detecting of the outline of the image comprises:
      obtaining feature information of respective edges in the image; and
      normalizing intensities of the edges.

2. The method according to claim 1, wherein the detecting of the outline of the image comprises:
   detecting a long edge in the image and obtaining feature information of the long edge.

3. The method according to claim 2, wherein the detecting of the outline of the image comprises:
   implementing a steerable filtering to obtain the feature information, wherein the feature information of the edges comprises edge position, edge orientation, and edge intensity;
   making the intensities of the edges uniform; and
   connecting the normalized intensities of the edges according to edge orientations to obtain the long edge.

4. The method according to claim 3, wherein the generating of the index list in the image database according to the outline features comprises:
   generating the index list for the feature information of the long edge in an inverted order.

5. The method according to claim 4, wherein the generating of the index list for the feature information of the long edge in the inverted order comprises:
   generating an index entry (x, y, θ) according to the obtained feature information of the long edge;
   making statistics of gradient orientation of each pixel in each image sequentially and storing an index number of each image in a corresponding index entry (x, y, θ); and
   generating the index list for the index entry (x, y, θ) in the inverted order.

6. The method according to claim 5, wherein the obtaining of the sketch and the retrieving of the images containing the sketch from the index list according to the sketch comprises:
   detecting the outline feature of the sketch;
   determining whether the index list contains a long edge similar to the outline of the sketch according to accumulated hits; and
   obtaining images containing the long edge based on the accumulated hits.

7. The method according to claim 6, wherein the determining of whether the index list contains the long edge similar to the outline of the sketch according to accumulated hits comprises:
   detecting the feature information of each pixel in the outline of the sketch, wherein the feature information of the pixel comprises a position feature and an orientation feature; and
   determining whether the index list contains pixels in the long edge that are similar to the pixel in the outline of the sketch.

8. The method according to claim 6, wherein the obtaining of the images containing the long edges based on the accumulated hits comprises:
   performing a preliminary retrieval from the index list and generating a candidate image set for the images containing the long edge; and
   when a new sketch is detected, performing the retrieval again and updating the candidate image set.

9. The method according to claim 8, wherein the generating of the candidate image set for the images containing the long edge comprises:
   sorting the images in the candidate image set according to rankings of similarity thereof after determining the index list contains the long edge similar to the outline of the sketch.

10. The method according to claim 9, wherein the obtaining of the sketch input by the user and the retrieving of the images containing the sketch from the index list further comprises:
   displaying the images in the candidate image set underlying the sketch input by the user in a superimposed manner according to the rankings of the similarity thereof.

11. The method according to claim 10, wherein the superimposed manner comprises presenting part of the long edges of the image not overlapped with the outline of the sketch as a background image.

12. An image retrieval device, the device comprising:
   an image outline detection module configured to detect an outline of an image and obtain an outline feature of the image;
   an outline feature management module comprising an index list generated in an image database according to the outline feature; and
   a retrieval module configured to obtain a sketch input by a user and retrieve images containing the sketch from the index list,
   wherein the image outline detection module is configured to obtain feature information of respective edges in the image and to normalize intensities of the edges.

13. The device according to claim 12, wherein the image outline detection module is configured to detect a long edge of the image and obtain feature information of the long edge.

14. The device according to claim 13, wherein the image outline detection module comprises:
   a steerable filtering unit configured to implement a steerable filtering to obtain feature information, wherein the feature information of the edges comprises edge position, edge orientation, and edge intensity;
   a normalization unit configured to make the intensities of the edge uniform; and
   a long edge obtaining unit configured to connect the normalized intensities of the edges according to the edge orientations to obtain the long edge.

15. The device according to claim 14, wherein the outline feature management module generates the index list for the feature information of the long edge in an inverted order.

16. The device according to claim 15, wherein the index list comprises:
   an index entry (x, y, θ) generated according to the obtained feature information of the long edge;

a gradient orientation of each pixel in each image and the index number of each image stored in the corresponding index entry (x, y, θ); and an inverted sorting unit configured to generate the index list for the index entry (x, y, θ) in an inverted order.

17. The device according to claim 16, wherein the retrieval module comprises:

an outline feature extraction unit configured to detect the outline feature of the sketch;

a determination unit configured to determine whether the index list contains a long edge similar to the outline of the sketch; and an image retrieval unit configured to retrieve images containing the long edge.

18. The device according to claim 17, wherein the outline feature obtaining unit is configured to:

detect the feature information of each pixel in the outline of the sketch, wherein the feature information of the pixel comprises a position feature and an orientation feature; and determine whether the index list contains a pixel in the long edge similar to the pixel in the outline of the sketch.

19. The device according to claim 17, wherein the image retrieval unit is configured to:

perform a preliminary retrieval from the index list and generate a candidate image set for the images containing the long edge; and perform the retrieval again when a new input sketch is detected and update the candidate image set.

20. The device according to claim 19, wherein the image retrieval unit is configured to:

sort the images in the candidate image set according to rankings of the similarity thereof after determining the index list contains the long edge similar to the outline of the sketch.

21. The device according to claim 20, further comprising:
a display module configured to display the images in the candidate image set underlying the sketch in a superimposed manner according to the rankings of the similarity thereof.

22. The device according to claim 21, wherein the superimposed manner comprises presenting part of the long edge of the image not overlapped with the outline of the sketch as a background image.

23. A real-time drawing prompting method, the method comprising:

detecting and displaying a sketch input by a user on a drawing area;

obtaining the sketch;

retrieving images containing the sketch; and displaying the retrieved images underlying the sketch as a background image in a superimposed manner with weights, wherein the obtaining of the sketch comprises:
obtaining feature information of respective edges from an outline of the sketch; and
normalizing intensities of the edges.

24. The method according to claim 23, further comprising:
when the sketch changes, retrieving images containing the sketch again and displaying the updated background images in real time.

25. The method according to claim 24, wherein the changes of the sketch comprise at least one of:
a new sketch sequentially input by the user is detected;
a sketch that the user traces the background image is detected; and a new sketch input by the user is detected after erasing an existing sketch.

26. The method according to claim 23, wherein the displaying of the retrieved images underlying the sketch as a background image in a superimposed manner with weights comprises:

differentially displaying the retrieved images containing the sketch according to rankings of similarity thereof.

27. The method according to claim 26, wherein the differential displaying of the retrieved images comprises at least one of:

a correspondingly deep color is displayed according to a degree of similarity between the retrieved images and the sketch; and a correspondingly bright luminance is displayed according to the degree of similarity between the retrieved images and the sketch.

28. The method according to claim 23, further comprising:
when the images containing the sketch are retrieved, generating a candidate image box and displaying the images for user selection in the candidate image box when the similarity reaches a threshold.

29. The method according to claim 28, wherein the displaying of the images in the candidate image box when the similarity reaches the threshold comprises:

sorting the images containing the sketch according to the rankings of the similarity thereof.

30. The method according to claim 28, wherein the displaying of the images in the candidate image box when the similarity reaches the threshold comprises:

when the user selecting an image displayed in the candidate image box is detected, displaying an image superimposed with a weight as a background image with highlight or in deep color corresponding to the selected image.

31. A real-time drawing prompting device, the device comprising:

a sketch detection module configured to detect and display a sketch input by a user on a drawing area and obtain the sketch;

an image retrieval module configured to retrieve images containing the sketch; and a display module configured to displaying the retrieved images underlying the sketch as a background image in a superimposed manner with weights, wherein the sketch detection module is configured to obtain feature information of respective edges from an outline of the sketch and to normalize intensities of the edges.

32. The device according to claim 31, wherein the image retrieval module is further configured to:

retrieve images containing the sketch again and sending the retrieved images to the display module when the sketch changes, so that the display module displays the updated background image in real time.

33. The device according to claim 31, wherein the sketch detection module is further configured to:

detect a new sketch sequentially input by the user;
detect a sketch that the user traces the background image; and detect a new sketch input by the user after erasing an existing sketch.

34. The device according to claim 31, wherein the display module is further configured to:

differentially display the retrieved images containing the sketch according to rankings of similarity thereof.

35. The device according to claim 34, wherein the display module is further configured to:
- display a retrieved image in a correspondingly deep color when the retrieved image has a threshold similarity with the sketch; or
- display a retrieved image in a correspondingly bright luminance when the retrieved image has the threshold similarity with the sketch.

36. The device according to claim 31, further comprising:
- a candidate image box configured to display the images therein which the similarity reaches a threshold for the user to select when the image retrieval module retrieves images containing the sketch.

37. The device according to claim 36, wherein the candidate image box is further configured to:
- sort the images containing the sketch according to rankings of the similarity thereof.

38. The device according to claim 36, wherein the display module is configured to:
- when the user selecting an image displayed in the candidate image box is detected, display an image superimposed with a weight as a background image with highlight or in deep color corresponding to the selected image.

* * * * *